Figure 1:
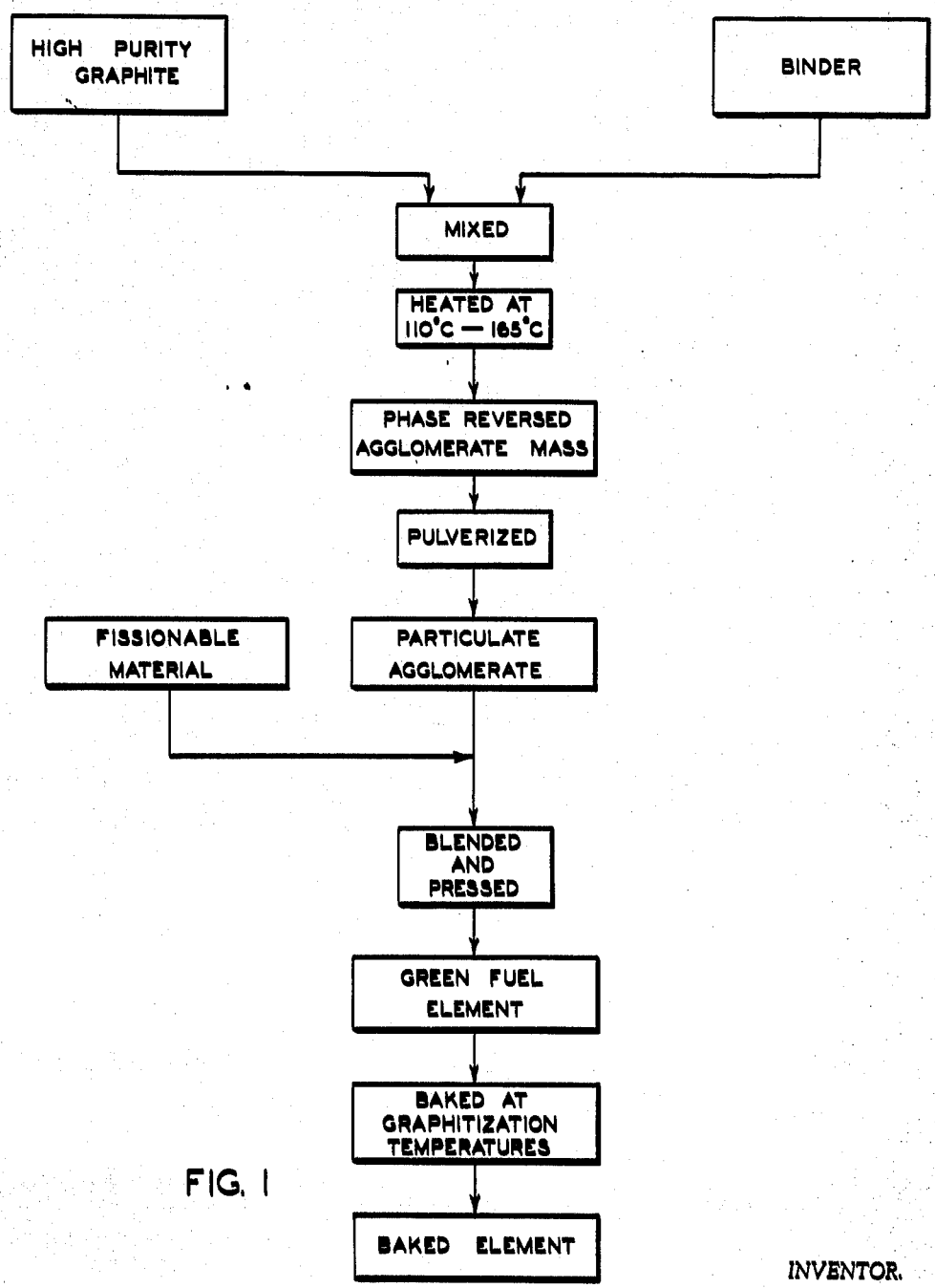

INVENTOR.
GEORGE T. SERMON

United States Patent Office 3,236,921
Patented Feb. 22, 1966

3,236,921
METHOD OF MAKING HIGH STRENGTH
NUCLEAR REACTOR ELEMENTS
George T. Sermon, 1147 Pine Road, Essexville, Mich.
Filed Jan. 15, 1962, Ser. No. 169,701
5 Claims. (Cl. 264—.5)

This application is a continuation-in-part of application Serial No. 744,807, filed June 26, 1958, now abandoned.

This invention relates to high purity nuclear reactor fuel and blanket elements and the like and to methods of preparing such elements.

Presently, many reactor fuel and blanket elements, which carry fissionable material and fertile material respectively, are conventionally formed by impregnating a graphite matrix or the like with the particular material, however, fuel and blanket elements formed in this manner have not been as satisfactory as desired. While various methods of impregnation have been suggested, none has provided a satisfactorily uniform dispersal of the fissionable or fertile material and it was found that in fact much of the impregnated material tended to remain near the surface of the matrix so that in order to achieve some modicum of uniformity surface portions of the elements where the impregnated material was concentrated had to be machined off. If there is no uniformity of dispersion of the critical mass in the moderator material, the fuel element tends to heat up in spots, which causes its relatively rapid deterioration. Further, the amount of material which can be introduced to the matrix by impregnation is limited.

Another important aspect of nuclear reactor fuel element design is the control of the critical mass which the element must carry and this in turn is affected by the neutron reflectivity characteristics of the blanket element. The amount of fissionable material which a fuel element should ideally carry for normal operation within the desired temperature range can be predetermined but with present methods of forming the fuel and blanket elements it is difficult to impregnate the desired amount of material into either element with any accuracy. Further, since the criticality of the mass is affected by the uniformity of reflection of neutrons by the blanket as well, which is dependent on the uniformity of dispersion of the breeder material in the blanket, the determination of the actual critical mass obtained is complicated by present methods of forming these elements. Also, in the case of the blankets which were impregnated with a breeder material, it was found that non-uniformity of dispersion of the breeder material in the blanket matrix was highly detrimental to achieving a controlled production of fissionable materials as a by-product of the reactor operation.

One of the prime objects of the present invention is to provide methods of forming elements of the character described in which the critical or nuclearly reactive material is pre-blended with ultra high purity graphite to uniformly disperse it throughout the element and bonded with graphitized coal tar pitch in such proportions that the boron content of the product is below a level which would provide substantial neutron absorption characteristics.

Another object of the invention is to provide elements of the character described which do not have appreciable losses due to volatilization of the critical materials at the high temperatures of operation of the reactor.

Another object of the invention is to provide energy producing elements for nuclear reactors whose tensile breaking strengths are not appreciably affected by the fact that dispersed critical materials are carried.

Another object of the invention is to provide a method of introducing critical materials into matrices or carriers which is much more efficient, reliable, and economical than the methods in present use.

A further object of the invention is to provide reactor fuel and blanket elements which do not readily corrode, are highly thermally conductive, exhibit a high resistance to thermo-shock, and can withstand extremely high temperatures.

A further object of the invention is to provide elements which are resistant to thermo-stresses, creep, and uneven shrinkage, are capable of withstanding sharp thermal gradients, and retain their original shape even after prolonged use at high temperatures.

A further object of the invention is to provide nuclear reactor fuel and blanket elements which are resistant to radiation damage and have a high product retention value.

Other objects and advantages of the invention will appear as the specification proceeds and will become apparent to those skilled in the art to which this invention appertains. The drawing is a schematic representation illustrating the invention and is identified as FIGURE 1.

Inexpensive fuel elements exhibiting highly satisfactory characteristics can be prepared in the manner which will now be disclosed and the method employed provides a uniform dispersion of the fissionable material in the moderator core. It has been determined that graphite makes a very excellent moderator material because of its low neutron absorption cross-section, its high moderating ratio, good thermo-conductivity, its strength, creep resistance at elevated temperatures, and its high thermal shock resistance. It also serves as a very good blanket material for substantially the same reasons.

The process which is illustrated in the drawing involves first of all the mixing of a raw mixture of coal tar pitch with synthetic graphite in a relatively pure state. The coal tar pitch preferred and used is a high melting range pitch obtained from the Barrett Division of Allied Chemical & Dye Corporation which has a high coking value. This pitch has a free carbon content of 27%–32%, a coking value of 40%, and an ash content of about 100 parts per million by weight which contains less than .2 part per million boron by weight. It melts at temperatures between 206° to 218° Fahrenheit and is broken down to particles less than ¼ inch in size before being mixed with the graphite. The graphite preferred and used is the Mexican type, designated No. 205 by the supplier, United States Graphite Division of The Wickes Corporation, which is about 95% carbon and is guaranteed to contain less than 15% ash. This amorphous graphite is purified in the manner disclosed in Patent No. 2,734,799, or Patent No. 2,734,800, to a state in which it contains less than .02 part per million boron by weight and less than 10 parts per million ash by weight and is used in particles sizes of 100 mesh or finer. Preferably its particles will be 200 mesh in the form in which it is mixed with the coal tar pitch.

The raw mixture has been found to produce a satisfactory graphite fuel element matrix with a satisfactory boron level below .1 part per million by weight if the mixture provides 2 to 5 parts by weight of pitch to 8 to 50 parts by weight of graphite. To provide a graphite bond of sufficient strength in the fuel element, the composition should preferably be at least 20% pitch by weight and ideally will be 45 to 50% by weight.

The raw mixture of coal tar pitch and the pulverulent graphite is placed in a steam jacketed, intensive mixer of the double sigma type and thoroughly blended while being heated relatively slowly to a temperaure of approximately 165° C. As the composition is being heated, its constituents are initimately blended in the mixer and certain liquid hydrocarbons are distilled from the pitch at temperatures above 110° C. When the mass becomes substantially soldified, it is removed from the mixer and the phase reversed mass is pulverized and screened. In this solidified state the graphite and the pitch residue are thoroughly blended into a homogeneous mass which is phase reversed from a relatively liquid to solid state at the temperature of the mixture. However, the pitch residue still will contain hydrocarbons which, at higher temperatures than 165° C. will liquefy and wet the graphite. The fissionable material is added to the pulverized product or agglomerate in particulate form and is thoroughly blended with pitch residue-graphite particles. Preferably the fissionable material will take the form of fissionable uranium or plutonium, uranium oxide, or uranium carbide and any of the fissionable materials $U^{235}$, $U^{233}$, or $Pu^{239}$ or compounds thereof may be used in this state. The size of the pulverized pitch residue-graphite particules and the fissionable material particles will vary, of course; however, 100 to 200 mesh particles of both blending constituents have been found to be very satisfactory.

The blend of mix and fissionable material will, of course, depend on the percentage of reactive material it is desired that the moderator carry up to the point where the reactive material constitutes about 50% of the blend by weight. This amount will be sufficient to provide a critical mass of fissionable material in the moderator but will not be greatly more than this because of the difficulty of control which an undue amount or quantity of fissionable material would create. It will also be less in a relatively pure state than would introduce boron in such quantity as to unduly increase the overall boron content of the product. Thus it will contain less than about 5 parts per million boron by weight. Once blended, the product is placed in a die cavity in a conventional molding press and is molded under a pressure of 10 to 30 tons per square inch into a fuel element of desired shape. The shape is unimportant to the instant invention but may well be cubical or take any other desired form.

When the fuel elements are removed from the press they are baked slowly in an oven when has an inert atmosphere and is raised gradually to a relatively high temperature. During this baking operation the pitch is heated through its carbonization range and is reduced to free carbon or coked such that it provides what may be termed a free carbon bond at pitch carbonization temperatures in the range 775–1350° C. This free carbon which is the residue of the carbonized pitch thoroughly bonds the graphite and fissionable material in the intermediate stages of baking and furnishes the strong graphite bond which is formed upon the tool being thence heated to graphitization temperatures in the range 2000°–2600° C. The formation of first the amorphous, free carbon, coke bond and later the graphite bond occurs slowly and the baking process may continue for 12 hours or more as the tools are slowly brought to graphitization temperatures. If the fuel element is not baked at a temperature appreciably above 2000° C. there will be no chemical reaction between the fissionable material and the pitch residue carbon or graphite filler. However, at temperatures above 2000° C. $uranium^{233}$ and $uranium^{235}$ carbides, and $plutonium^{239}$ carbides will start to be formed. At 2600° C. the metals will have reacted to form uniformly dispersed carbides, or oxides of the fissionable materials, if the materials are introduced in such form, will have reacted to produce the carbides and the oxygen will be given off in the form of carbon dioxide. It is quite desirable to raise the fuel element to a temperature at whch the carbides of the fissionable materials are formed, since it has been found that the reactor can be operated at higher temperatures with the carbides than with the oxides and uncombined fissionable materials.

Of course, if the element being formed is a blanket element, the critical or nuclearly reactive material added will be thorium or a thorium compound. Thorium oxide of a relatively pure nature which does not contain impurities with large neutron absorption cross-sections will then simply be used in the process described in the place of the fissionable material. As examples of the described product and method, the following will yield satisfactory results and the proportions mentioned are by weight unless otherwise indicated:

*Example 1.*—A carbon-graphite mix containing 30 parts of coal tar pitch having 100 parts per million ash and less than .2 part per million boron and 70 parts of high purity amorphous natural graphite having 10 parts per million ash and less than .02 part per million boron is phase reversed at 165° C., cooled, and finely pulverized to 200 mesh. It is then blended with 100 mesh $uranium^{235}$ carbide particles having a boron content less than 5 parts per million in a ratio of 50 parts mix to 50 parts $uranium^{235}$. This intimately blended composition is compressed into a fuel element in a press which utilizes a pressure of 15 tons per square inch at the die cavity. Finally the article is baked slowly in a furnace with an inert atmosphere at a temperature gradually increased to 2000° C. over a period of 14 hours. The end product will comprise about 85% graphite to 15% pitch graphite because of the loss of about 15% of the pitch through devolatilization.

*Example 2.*—The composition and method employed in Example 1, except that $uranium^{235}$ oxide particles of the same size were used in place of the $uranium^{235}$ carbide particles, and the temperature of baking was increased gradually to 2600° C.

*Example 3.*—The composition and method employed in Example 1, except that thorium oxide was used in the place of the uranium carbide to form a blanket element, rather than a fuel element.

*Example 4.*—The composition and method employed in Example 1, except that $uranium^{235}$ metal was used in place of the $uranium^{235}$ carbide in the amount of 50 parts of the coal tar pitch and amorphous natural graphite mix to 50 parts of the $uranium^{235}$ metal.

The high strength of the energy-producing elements formed is due, in part, to the phase-reversing step described when the more volatile hydrocarbons are removed from the pitch at a temperature of 165° C. in the double sigma type mixer. The resulting solidified composition, when removed from the mixer, is extremely dense. When the element is later formed and baked it is considerably less porous than if these hydrocarbons were removed during the baking operation. Also, the extreme pressures used in compacting the elements, which are measurable in tons per square inch, provide elements of great strength and the high level of strength is also enhanced by the use of proper fillers. For instance, amorphous graphite is much preferred to crystalline graphite and the natural graphite is preferred to synthetic graphite.

In all cases, it is to be understood that the foregoing is to to be taken as illustrative of the invention rather than limiting its scope, the invention being limited only as is necessitated by the prior art and the appended claims.

I claim:

1. A method of making a high strength nuclear reactor element comprising: uniformly admixing a particulate coal tar pitch having a boron content of about .2 part per million by weight with a high purity graphite having a boron content of about .02 part per million by weight in the proportion of 20–50 weight percent pitch to 80–50 weight percent graphite; simultaneously heating the graphite and pitch in the temperature range 110° – 165° C. to substantial solidification; breaking up the substantially solidified admixture into particle size; mixing a particulate substance from the group consisting of fertile and fissionable materials having a boron content of about 5 parts per million by weight with the particulate admixture; pressure molding the resulting mixture into a body; and slowly heating the body to the graphitization temperature range.

2. A method of making a high strength nuclear reactor element comprising: uniformly admixing a particulate coal tar pitch having a boron content less than .2 part per million by weight with a high purity graphite having a boron content of less than .02 part per million by weight in the proportion of 20–50 weight percent pitch to 80–50 weight percent graphite; simultaneously heating the graphite and pitch in substantially the temperature range 110°–165° C. to substantial solidification; breaking up the substantially solidified admixture into particle size; mixing a particulate substance from the group consisting of fertile and fissionable materials having a boron content less than 5 parts per million by weight with the particulate admixture; forming the resulting mixture into a body; and slowly heating the body to a temperature at least sufficient to dehydrogenize the pitch to free carbon.

3. A method of making a high strength nuclear reactor element comprising: uniformly admixing a particulate coal tar pitch having a boron content less than .2 part per million by weight and a high purity graphite having a boron content of less than .02 part per million by weight in the proportion of 20–50 weight percent pitch to 80–50 weight percent graphite; simultaneously heating the graphite and pitch in the temperature range 110°–165° C. to substantial solidification; breaking up the substantially solidified admixture into particle size; mixing a particulate substance from the group consisting of fertile and fissionable materials with the particulate admixture; pressure molding the resulting mixture into a body; and slowly heating the body to the graphitization range, the boron content of the body following devolatilization and graphitization of the pitch carbon being less than .1 part per million by weight.

4. A method of preparing a high strength nuclear reactor element comprising: admixing coal tar pitch with a high purity graphite having a low boron content; simultaneously heating the pitch and graphite in substantially the temperature range 110°–165° C. to substantial solidification; breaking up the admixture into particle size; mixing a particulate substance from the group consisting of fertile and fissionable materials with the particular admixture; pressure molding the resulting mixture into a body; and slowly heating the body to a temperature sufficient at least to dehydrogenize the pitch to free carbon.

5. The combination defined in claim 4 in which the body is heated to the graphitization range.

References Cited by the Examiner
UNITED STATES PATENTS

| | | | |
|---|---|---|---|
| 2,708,656 | 5/1955 | Fermi et al. | 176—41 |
| 3,031,389 | 4/1962 | Goeddel et al. | 106—43 |
| 3,097,151 | 7/1963 | Martin | 176—89 X |
| 3,124,625 | 3/1964 | Sheinberg et al. | 264—21 |

OTHER REFERENCES

AEC Report BMI–T–26, Apr. 2, 1957, pp. 5 and 15.

AEC Document TID–10001, Oct. 13, 1954, pp. 8–12 and 35–42 and 52.

AEC Document TID–7546, Book 1, November 1957, pp. 236 and 237.

1st Geneva Conference on Atomic Energy, 1955, vol. 8, pp. 451–458.

Nuclear Fuel Elements, Hausner et al., November 1959, p. 179.

REUBEN EPSTEIN, *Primary Examiner.*

OSCAR R. VERTIZ, CARL D. QUARFORTH,
*Examiners.*

R. W. MACDONALD, L. D. RUTLEDGE,
*Assistant Examiners.*